(12) United States Patent
Gretz

(10) Patent No.: US 12,316,086 B1
(45) Date of Patent: May 27, 2025

(54) QUICK CONNECT FITTING FOR CONNECTING ANY MALE THREADED CONNECTOR OR RACEWAY TO AN ELECTRICAL BOX

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 216 days.

(21) Appl. No.: 18/223,480

(22) Filed: Jul. 18, 2023

Related U.S. Application Data

(60) Provisional application No. 63/389,979, filed on Jul. 18, 2022.

(51) Int. Cl.
*H02G 3/00* (2006.01)
*H02G 3/06* (2006.01)

(52) U.S. Cl.
CPC ............... *H02G 3/0616* (2013.01)

(58) Field of Classification Search
CPC .................................................. H02G 3/0616
See application file for complete search history.

(56) References Cited

U.S. PATENT DOCUMENTS

| 7,952,034 B2 * | 5/2011 | Kiely | H02G 3/0691 174/665 |
| 8,466,378 B1 * | 6/2013 | Gretz | H02G 3/0616 439/100 |
| 9,705,256 B1 * | 7/2017 | Smith | H01R 13/648 |

* cited by examiner

*Primary Examiner* — Pete T Lee

(57) ABSTRACT

A quick connect fitting for connecting any male threaded connector or raceway to an electrical box. The quick connect fitting includes a one-piece tubular body having a leading end for connection to a knockout and a trailing end for accepting any male threaded connector or raceway. A seat on the leading end of the tubular body includes a snap ring thereon for quick connection to the knockout of an electrical box. One or more locking tangs on the snap ring facilitate connection of the leading end of the fitting of the to the electrical box. One or more grounding tangs on the quick connect fitting enhance grounding of the fitting to the electrical box to establish continuity between the connector body and any male threaded pipe or conduit secured into the female threads on the trailing end of the fitting.

12 Claims, 6 Drawing Sheets

QUICK CONNECT FITTING FOR CONNECTING ANY MALE THREADED CONNECTOR OR RACEWAY TO AN ELECTRICAL BOX

This application claims the priority of Provisional U.S. Patent Application Ser. No. 63/389,979 filed Jul. 18, 2022.

FIELD OF THE TECHNOLOGY

The invention relates to the connection of electrical service to an electrical box. In particular, the invention relates to a quick connect fitting for connecting any male threaded connector or raceway to an electrical box.

BACKGROUND

Male threaded connectors or raceways are typically secured to the knockout of an electrical box using two locknuts, one for limiting the travel of the connector or raceway into the knockout and one for installing and tightening against the inside of the box to secure the connector to the box.

The connection of male threaded connectors or raceways to an electrical box is a laborious, time-consuming task. As an example, where several male threaded connectors or raceways are connected to one panel of the box, there is minimal clearance between the various knockouts which then adds substantially to the amount of installation time and cost.

Accordingly, there is a substantial need for a device for simplifying the task and reducing the installation time for connecting any male threaded connector or raceway to an electrical box.

BRIEF SUMMARY OF THE INVENTION

The invention is a quick connect fitting for connecting any male threaded connector or raceway to an electrical box. The quick connect fitting includes a one-piece tubular body having a leading end for connection to a knockout and a trailing end for accepting any male threaded connector or raceway. A seat on the leading end of the tubular body includes a snap ring thereon for quick connection to the knockout of an electrical box. One or more locking tangs on the snap ring facilitate connection of the leading end of the fitting of the to the electrical box. One or more grounding tangs on the quick connect fitting enhance grounding of the fitting to the electrical box to establish continuity between the connector body and any male threaded pipe or conduit secured into the female threads on the trailing end of the fitting.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION OF THE INVENTION

Figure 1:
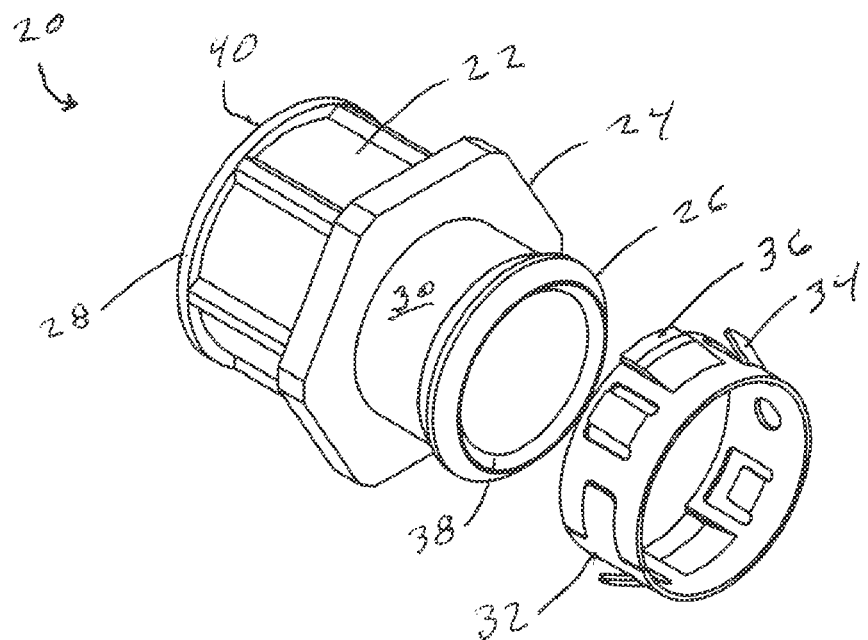
FIG. 1 is an exploded perspective view of a first embodiment of a fitting for connecting threaded rigid conduit to an electrical box according to the invention.

With reference to FIG. 1, the present invention is a fitting 20 for connecting threaded rigid conduit to an electrical box. The fitting 20 includes a tubular connector body 22 having a central flange 24, leading flange 26, and trailing flange 28. The connector body 22 includes a seat 30 between the leading flange 26 and trailing flange 28.

Figure 2:
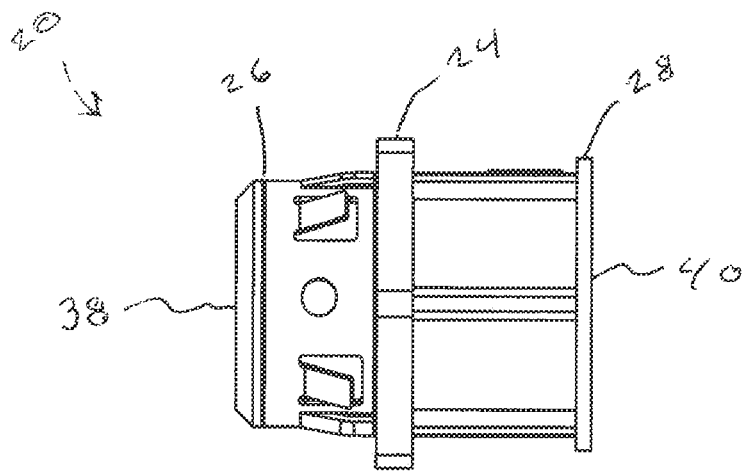
FIG. 2 is a side view of the assembled fitting.

Referring to FIG. 2, the assembled fitting 20 includes a snap ring 32 disposed on the seat 30. The snap ring 32 includes one or more locking tangs 34 and one or more grounding tangs 36. The assembled fitting 20 includes a leading end 38 and a trailing end 40.

Figure 3:
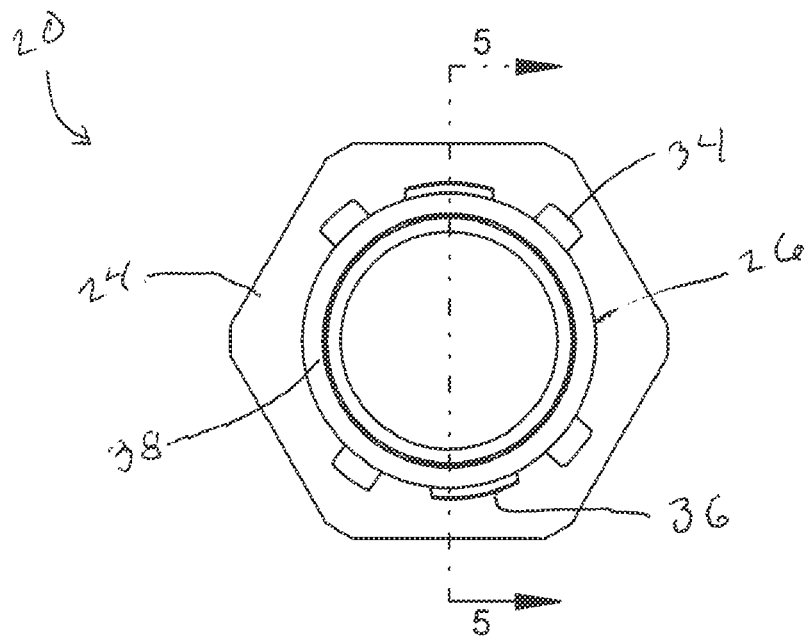
FIG. 3 is an end view of the fitting from the leading end.

With reference to FIG. 3, the one or more locking tangs 34 extend radially from the seat at the leading end 38 of the fitting. The one or more grounding tangs 36 also extend radially at the leading end 38 of the fitting.

Figure 4:
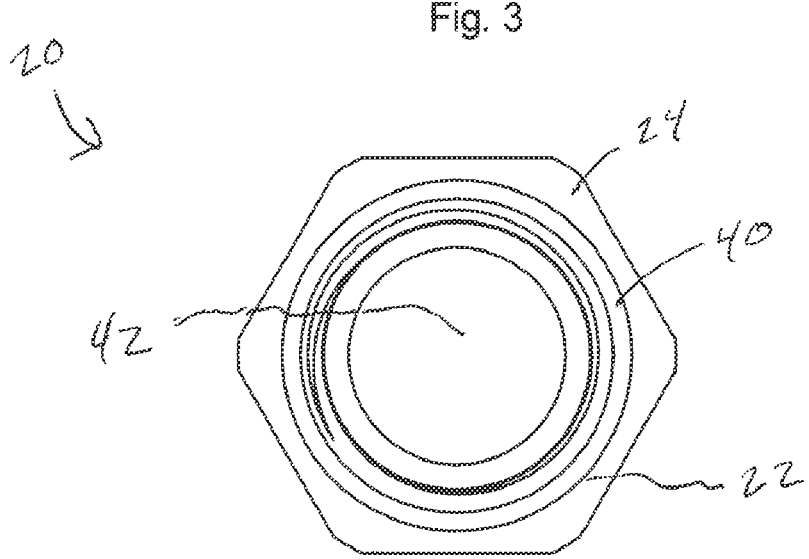
FIG. 4 is an end view of the fitting from the trailing end.

Referring to FIG. 4, the connector body 22 includes a bore 42 therethrough.

Figure 5:
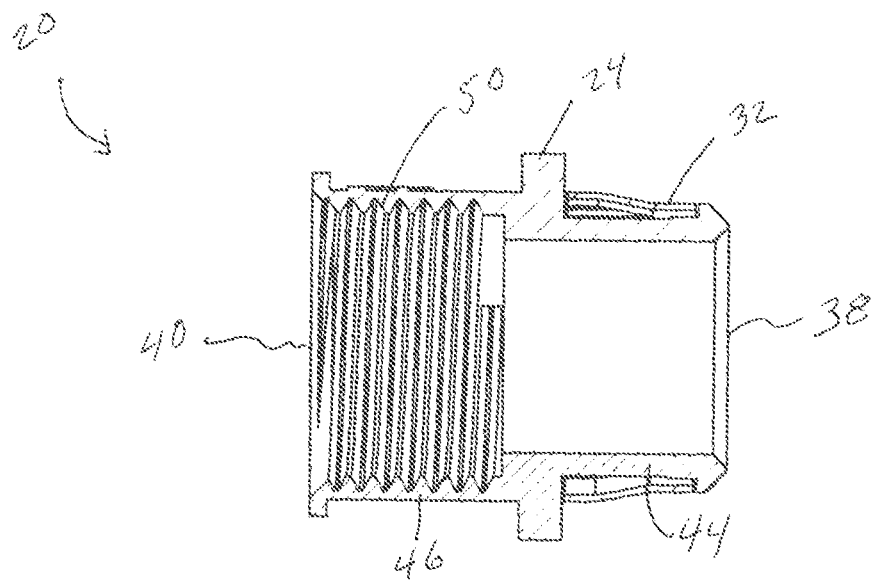
FIG. 5 is a sectional view of the fitting taken along line 5-5 of FIG. 3.
Figure 6:
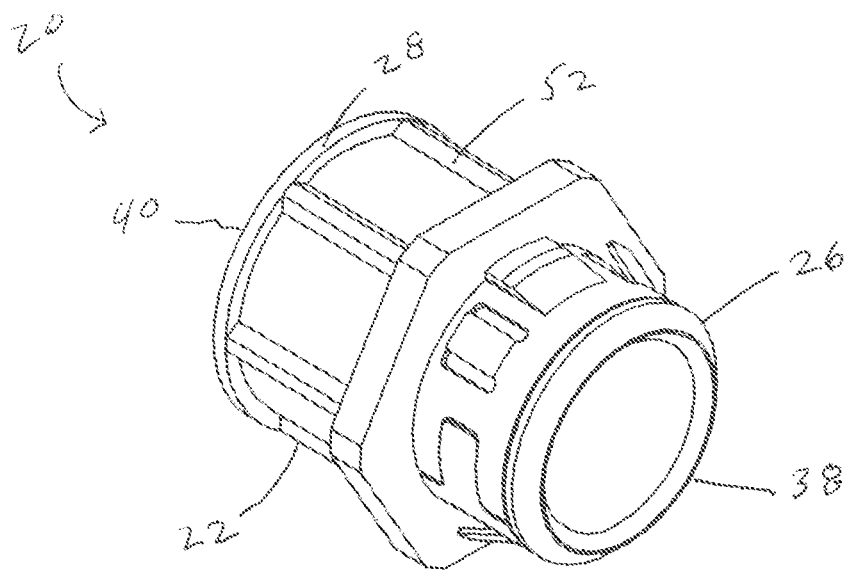
FIG. 6 is a front perspective view of the fitting.

With reference to FIG. 5, the connector body 22 includes a front wall portion 44 extending from the central flange 24 to the leading end 38 and a rear wall portion 46 extending from the central flange 24 to the trailing end 40. The front wall portion 44 includes a smooth inner wall 48 and the rear wall portion 46 includes threads 50.

Figure 7:
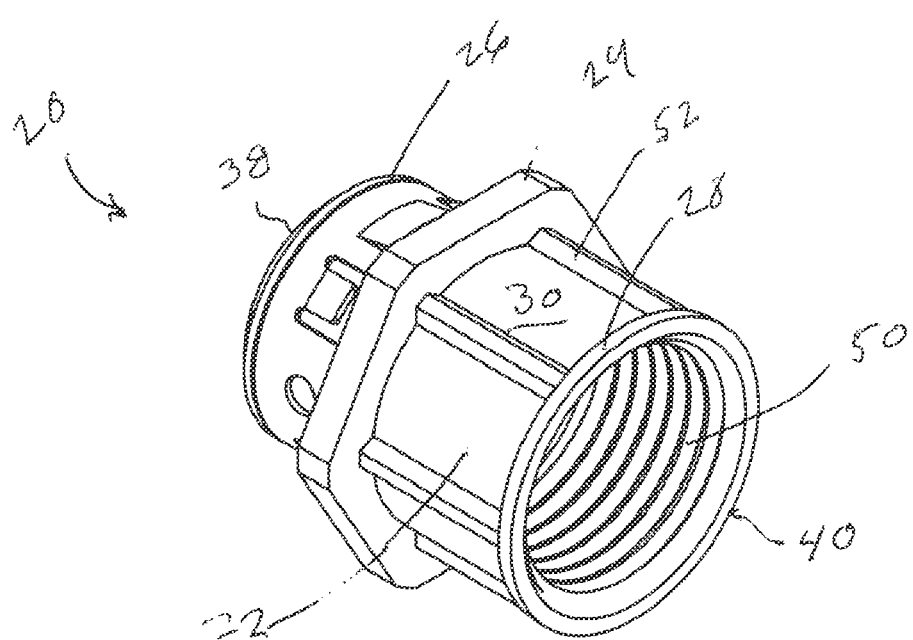
FIG. 7 is a front perspective view of the fitting.

Referring to FIG. 7, one or more ribs 52 extend longitudinally along the rear wall portion 46 of the connector body 22 from the central flange 24 to the trailing flange 28.

Figure 8:
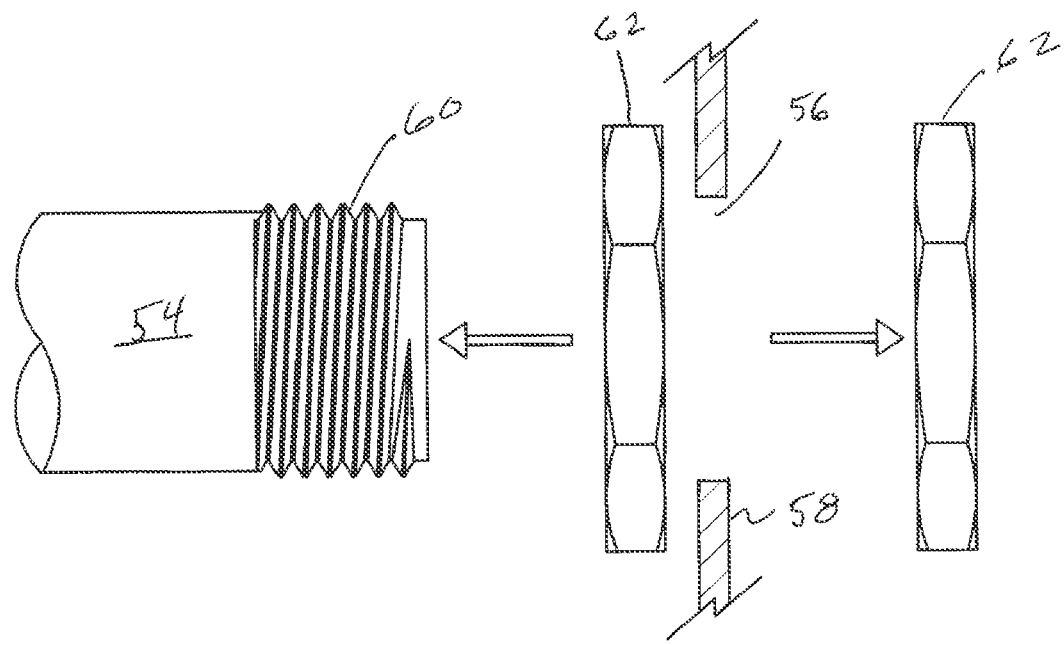
FIG. 8 is an illustration depicting the connection of an end of threaded rigid conduit to an electrical panel with locknuts (PRIOR ART).
Figure 10:
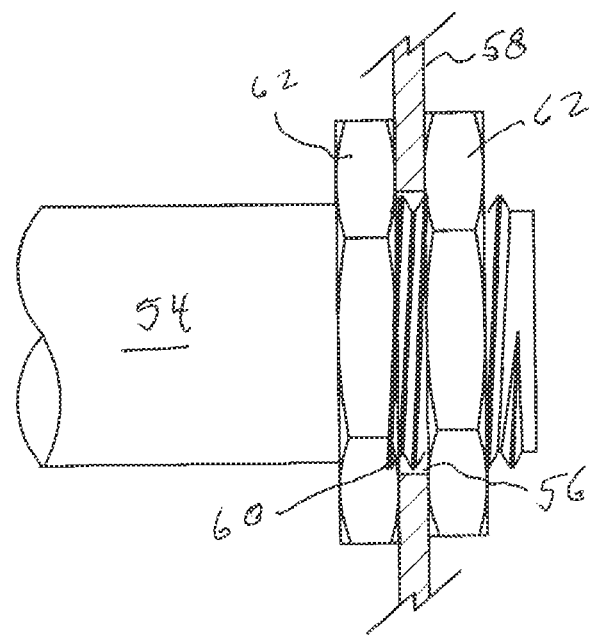
FIG. 10 is an illustration depicting a threaded rigid conduit secured to the electrical panel with locknuts (PRIOR ART).

With reference to FIG. 8, one prior art method of securing male threaded conduit 54 to a knockout 56 in an electrical panel 58 involves screwing a one locknut onto the threaded end of the conduit 54, inserting the threaded end 60 through the knockout 56, and then securing the conduit to the panel by inserting a second locknut 62 into the interior of the box and screwing it tightly to the threaded end 60 of the conduit until the two locknuts secure the conduit to the box as shown in FIG. 10.

Figure 9:
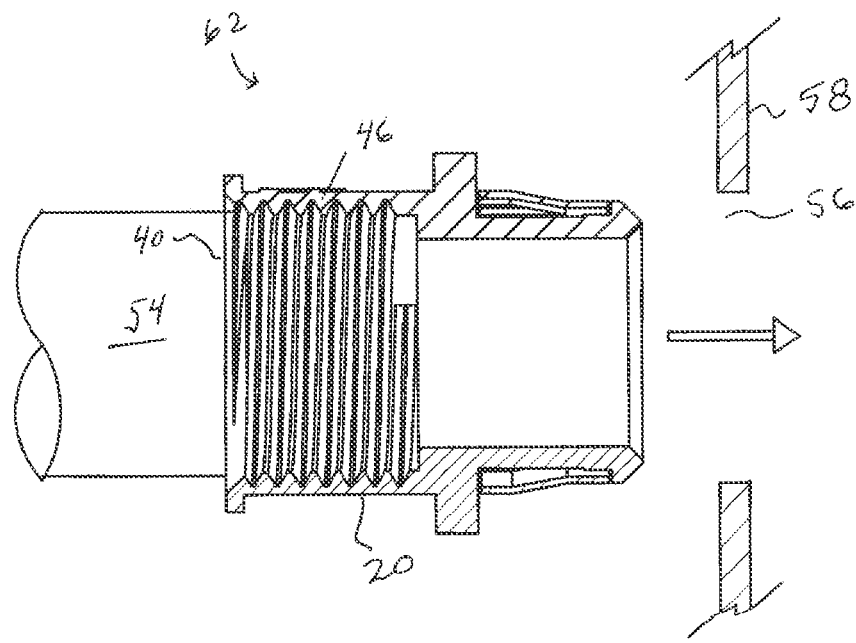
FIG. 9 is an illustration depicting an assembly of threaded rigid conduit to and the fitting of the invention in alignment to be snapped into a knockout in an electrical panel.
Figure 11:
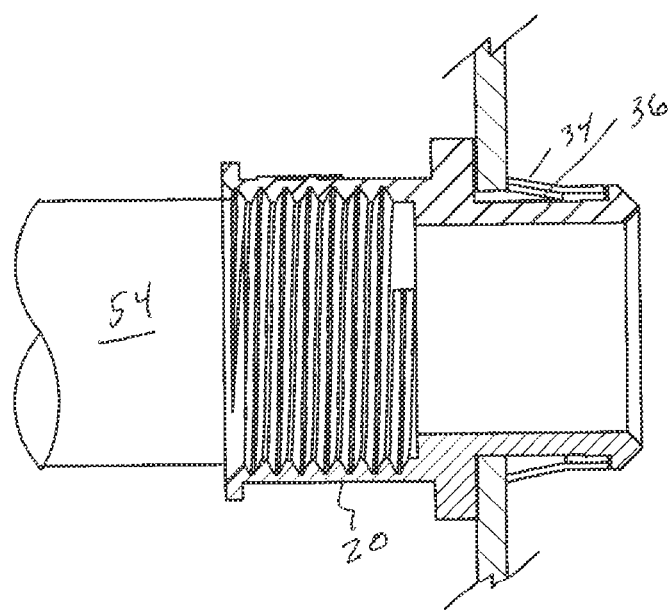
FIG. 11 is an illustration depicting the threaded rigid conduit and fitting assembly of the invention fully snapped into a knockout in an electrical panel.

Referring to FIG. 9, in the current invention, the threaded conduit 54 is screwed into the female threads 46 in the trailing end 40 of the fitting 20 to create an assembly 62 of threaded rigid conduit to the fitting. The assembly 62 is then simply snapped into the knockout 56 and, as shown in FIG. 11, is locked therein by the outward-biased locking tangs 34 of the fitting 20. The grounding tangs 36 of the fitting 20 create proper grounding and electrical continuity between the threaded conduit 54, the fitting 20, and the electrical panel 58 or box. By facilitating an easy snap-in connection of threaded conduit 54 to a knockout, the fitting 20 of the present invention reduces installation time and the associated labor expense.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although the description above contains many specific descriptions, materials, and dimensions, these should not be construed as limiting the scope of the inventions, but as merely providing illustrations of some embodiments.

What is claimed is:

1. A quick connect fitting for connecting any male threaded connector or raceway to an electrical box, comprising:
   a one-piece tubular body having a leading end for connection to a knockout of the electrical box and a trailing end for accepting a threaded conduit;
   a snap ring on said leading end of said body; and
   female threads on said trailing end of said body.

2. The fitting of claim 1, comprising a central flange and a leading flange extending radially from the body and defining a seat on the leading end of the body.

3. The fitting of claim 2, comprising a snap ring on said leading end of said quick connect fitting.

4. The fitting of claim 3, comprising one or more locking tangs on said snap ring.

5. The fitting of claim 3, comprising one or more grounding tangs on said snap ring.

6. The fitting of claim 1, comprising a bore through said connector body.

7. The fitting of claim 2, comprising a front wall portion on said connector body extending from said central flange to said leading end.

8. The fitting of claim 7, comprising a rear wall portion extending from said central flange to said trailing end.

9. The fitting of claim 8, comprising the front wall portion includes a smooth inner wall.

10. The fitting of claim 9, comprising the rear wall portion includes female threads in said bore.

11. The fitting of claim 8, comprising one or more ribs extending longitudinally along the rear wall portion of the connector body.

12. The fitting of claim 11, comprising said ribs extending from the central flange to the trailing flange.

\* \* \* \* \*